United States Patent [19]

Mutzhas

[11] Patent Number: 4,529,269
[45] Date of Patent: Jul. 16, 1985

[54] RADIATION PROTECTION FILTER FOR PLANTS

[76] Inventor: Maximilian F. Mutzhas, Sonnenstr. 17, 8000 Munchen 2, Fed. Rep. of Germany

[21] Appl. No.: 505,437

[22] Filed: Jun. 17, 1983

[30] Foreign Application Priority Data

Jun. 23, 1982 [DE] Fed. Rep. of Germany ....... 3223445

[51] Int. Cl.³ ............................ G02B 5/24; G02B 5/22; G02B 1/06; G02B 1/04
[52] U.S. Cl. .................................... 350/312; 350/311; 350/1.6
[58] Field of Search ................ 350/311, 312, 166, 1.1, 350/1.5, 1.6, 1.7

[56] References Cited

U.S. PATENT DOCUMENTS

| | | | |
|---|---|---|---|
| 3,052,153 | 9/1962 | Powell | 350/311 |
| 3,629,130 | 12/1971 | Hovey | 350/1.6 |
| 4,247,167 | 1/1981 | Tokuhara et al. | 350/166 |
| 4,381,136 | 4/1983 | Hosch et al. | 350/311 |

*Primary Examiner*—Jon W. Henry
*Attorney, Agent, or Firm*—C. O. Marshall, Jr.

[57] ABSTRACT

A radiation protection filter for plants wherein
$\tau 1 < 0.02$
$\tau 3 > 0.4$
$\tau 3 / \tau 4 > 1.5$
$\tau 4 < 0.4$
$\tau 5 / \tau 4 > 2$
$\tau 6 / \tau 4 > 2$ and wherein $\tau 1$ = average of spectral transmittance between 300 and 330 nm.

$\tau 3$ = average of spectral transmittance between 400 and 500 nm.

$\tau 4$ = average of spectral transmittance between 500 and 600 nm.

$\tau 5$ = average of spectral transmittance between 600 and 700 nm.

$\tau 6$ = average of spectral transmittance between 700 and 800 nm.

14 Claims, 6 Drawing Figures

RADIATION PROTECTION FILTER FOR PLANTS

The invention concerns a new kind of radiation protection filter for plants.

Greenhouse glasses and garden horticultural foils haave been so far mainly used as radiation protection filters for plants. Greenhouse glasses consists generally of window glass, wire reinforced glass, acrylic glass, poly-carbonate or glass-fiber reinforced plastic. Horticultural foils consist generally of polyethylene, polyvinyl chloride, polyvinyl fluoride or cellulose acetate.

The spectral transmittance (i.e., the relation of the radiation transmitted by the filter to the striking radiation) is almost constant in ranges of 400 to 2500 nm by the usual radiation protection filters and drops progressively under 400 nm, although considerable radiation is still transmitted under 330 nm.

Thorough researches based on the invention have shown that the usual radiation protection filters have no optimal spectral transmittance for plants. The invention intends to develop a new radiation protection filter producing by a differentiated design of the spectral transmittance optimal growth conditions for plants.

This goal will be achieved according to the invention by a radiation protection filter indicating the following values and proportional factors of spectral transmittance in individual wavelength ranges:

(a) $\tau 3 > 0.4$, preferably $> 0.5$
(b) $\tau 3/\tau 4 > 1.5$, preferably $> 2$
(c) $\tau 4 < 0.4$, preferably $< 0.3$
(d) $\tau 5/\tau 4 > 2$, preferably $> 2.5$
(e) $\tau 6/\tau 4 > 2$, preferably $> 2.5$ whereby $\tau 3$ = average of spectral transmittance between 400 and 500 nm
$\tau 4$ = average of spectral transmittance between 500 and 600 nm
$\tau 5$ = average of spectral transmittance between 600 and 700 nm
$\tau 6$ = average of spectral transmittance between 700 and 800 nm.

The invention shows that the radiation in wavelength range between 500 and 600 nm is not important in the photo-biologic field. In compliance with the invention, the spectral transmittance in this wave-length range between 500 and 600 nm will therefore be considerably reduced ($\tau 4 < 0.4$). This gives the possibility to extremely increase the transmittance in wavelength ranges important for the photo-biology with the same global radiation load. In wave-length range between 400 and 500 nm, the average of the spectral transmittance according to the invention $\tau 3 > 0.4$, whereby $\tau 3/\tau 4$ is $> 1.5$. For wave-length ranges from 600 to 700 nm and 700 to 800 nm importan for the photobiology as well, according to the invention $\tau 5/\tau 4$ is $> 2$ and $\tau 6/\tau 4 > 2$.

The radiation protection filter complying with the invention shows in this sense a pronounced "depression" of the spectral transmittance in wavelength range between 500 and 600 nm.

In wavelength range between 400 and 500 nm, the short-wave maximum of photosynthesis, chlorophyllsynthesis and photomorphogenesis exist as well as the maximum of phototropism and the absorption of the carotinoids.

On the contrary, a minimum of the action spectra of photosynthesis, chlorophyllsynthesis, photomorphogenesis and phototropism is in the strongly lowered wavelength range between 500 and 600 nm of the spectral transmittance according to the invention, as well as a maximum of spectral reflectance of the leaves.

On the contrary, in wavelength range between 600 and 700 nm, a longwave maximum of photosynthesis, chlorophyllsynthesis and photomorphogenesis ("near-red" phytochrom reaction) is observed.

In the wavelength range between 700 and 800 nm, a longwave maximum of photomorphogenesis ("far-red" phytochrom reaction) finally occurs.

By raising according to the invention the average of the spectral transmittance in the wavelength ranges between 400 and 500 nm and 600 to 800 nm which are particularly useful in the photobiology and by strongly lowering the unimportant range between 500 and 600 nm, an optimisation of the radiation necessary for the growth of the plants is obtained with the same global radiation load of the plants.

According to a proper elaboration of the invention, the arithmetical average of the spectral transmittance $\tau 1$ is $< 0.02$ and preferably $< 0.01$ in the range between 300 and 330 nm.

Detailed investigations have shown that in this wavelength range even small radiation parts as they are provided in the usual radiation protection filters cause considerable damages to the plants (dimerization of the DNA in the nucleus and in the chloroplasts, photodestruction of pigments, mutation of proteins, collapse of cell walls of the epidermis, reduction of the photosynthetic activity, less growth and yield).

By reducing the radiation between 300 and 330 nm, it is possible under use of the radiation protection filter complying with the invention to cultivate successfully plants in high mountain regions as well as in areas with high zenith sun position (regions nearing the Equator) which so far did not grow there due to the high radiation part between 300 and 330 nm. This applies in particular under consideration of a restrained ozone concentration of the troposphere and atmosphere caused by the hydrocarbon fluorides of propellent gas or of exhaust gas of high flying planes leading to an increase of the radiation under 330 nm.

According to a further proper elaboration of the radiation protection filter complying with the invention, a spectral transmission $\tau 2$ will be chosen for the wave-length area between 330 and 400 nm by which $\tau 2/\tau 4$ is $> 1$, preferably $\tau 2/\tau 4 > 1.5$.

In this wavelength range a photoreactivation takes place by monomerization of dimers in the DNA, further, important biological processes of the photosynthesis, the chlorophyllsynthesis and the photomorphogenesis take place here. In this range the eyes of insects can see, which is important for the fertilization of the plants.

Preferred values of the spectral transmittance in the individual wavelength ranges are further the object of the sub-claims 4 to 6. Advantageous is here a reduction of the spectral transmittance in the wavelength range above 800 nm, in order to obtain in this way a maximum radiation for a certain global radiation load of the plants in the important biologic radiation range between 330 and 500 nm as well as between 600 and 800 nm.

A radiation protection filter with spectral transmittance complying with claim 1 can be manufactured according to the invention out of plastic sheets or foils such as polyvinyl chloride, polyethylene, polymethacrylic and methyl ester, polyester, polyethyleneterephtalat, polycarbonat or fluoropolymer with stains embedded therein, or out of a glass sheet comprising one or more oxides of cerium, cobalt, copper, manganese or nickel. Also a glass sheet containing ceroxide and colloidal dissolved gold, copper or selenium can be heated during 15 to 45 minutes after being manufactured, preferably some 30 minutes at a temperature of 400 to 600, preferably about 500° C. Their declining absorption edge lies between 450 and 500 nm and their rising absorption edge between 575 and 625 nm.

The following stains are particularly appropriate: monoazo, diazo, anthraquinone, phthalocyanin, perylen, quinakridon as well as thin ground colored glass powder.

In order to give the radiation protection filter the additional characteristics complying with claim 1, organic, UV absorbing substances with steep absorption edge lying between 330 and 360 nm are embedded in the plastic material. Appropriate UV-absorbing substances are the following: benzophenone, benzotriazole, combinations with salicylic, cinnamic and oxalic acids.

The attenuation of the radiation planned according to claims 5 and 6 above 800 nm can be made according to the invention by adding an extra layer of water, glycerol, glycol or a mixture of said liquids. To this effect, a plastic sheet formed with water pipes or a plastic foil fitted with naps (in order to build a water supplying cavity) can be used. Since the water which is used to reduce the longwave radiation becomes heated the various possible thermal applications can be used, which however should not be explained in detail in the frame of this invention.

According to the invention, the radiation protection filter can also be made of glass (compare claims 12 and 13).

A more precise explanation of the invention is given by the following drawings.

Figure 1:
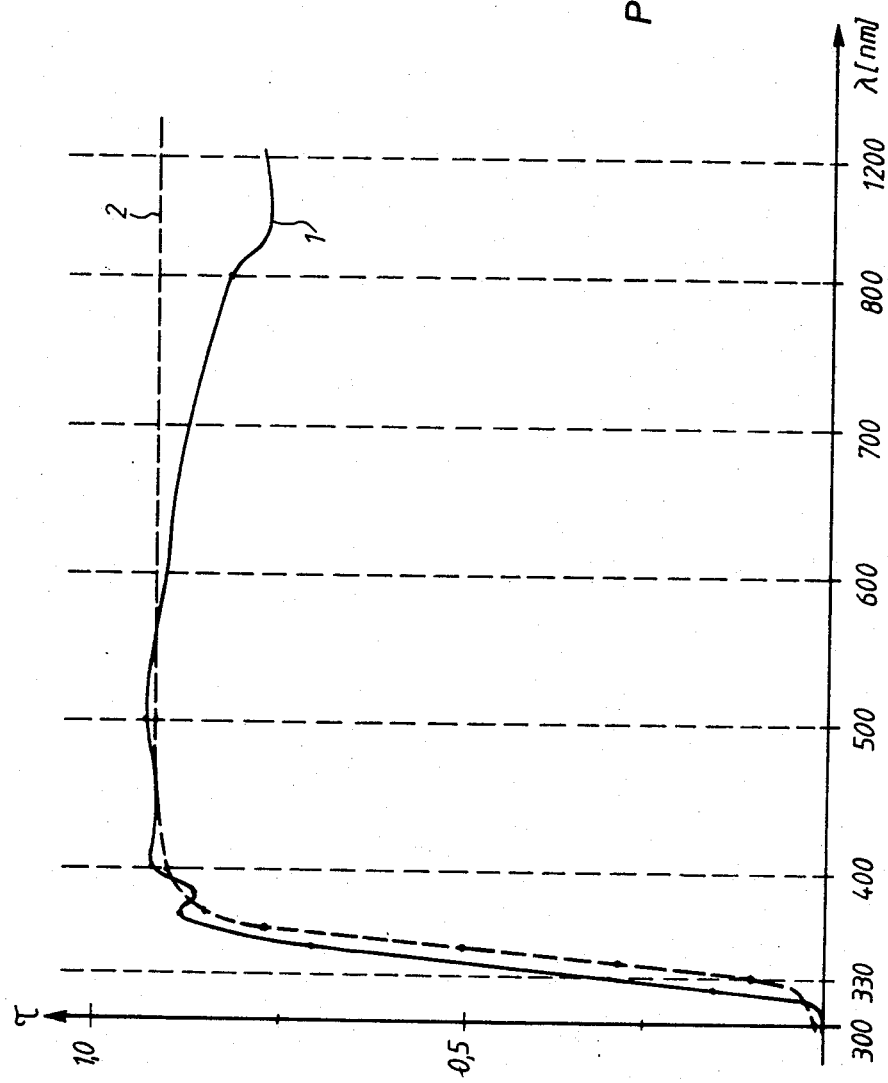
FIG. 1 shows a diagram of the spectral transmittance (transmittance as a function of the wavelength) for two usual radiation protection filters.

The diagram corresponding to FIG. 1 shows the run of the spectral transmittance (in the range of 300 to 1200 nm) for two usual radiation protection filters. Curve 1 shows the transmittance for one glass radiation protection filter (4 mm), and curve 2, the transmittance for a PVC horticultural foil (0.2 mm).

One notices that in the range of 400 to 800 nm the transmittance is almost constant whereas under 330 a considerable radiation part is still present.

Figure 2:
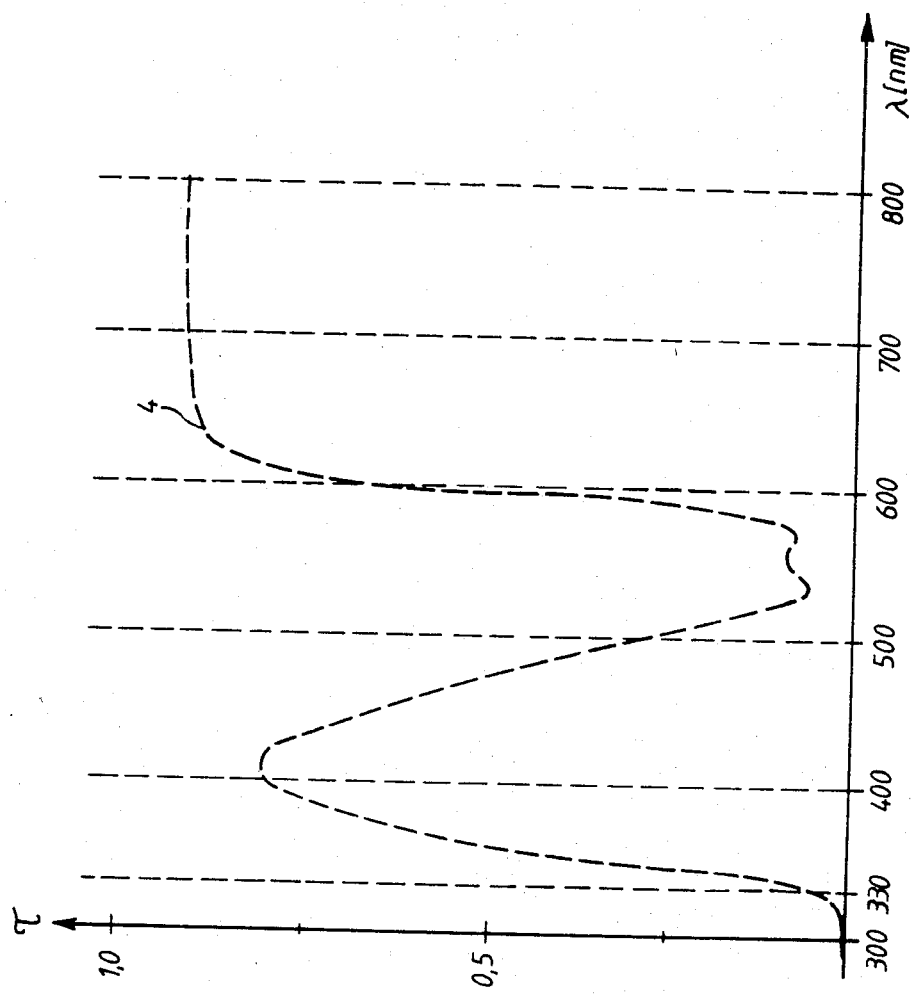
FIG. 2 shows a diagram corresponding to FIG. 1 for three radiation protection filters complying with the invention (wavelength range between 300 and 800 nm).

FIG. 2 illustrates on the other hand the relations for the radiation protection filter complying with the invention (three different models corresponding to diagrams 3, 4 and 5). In all three cases, one can notice the distinct depression of the spectral transmittance in the wavelength range between 500 and 600 nm, as well as the strong diminution of the radiation in the wavelength range between 300 and 330 nm.

Figure 3:
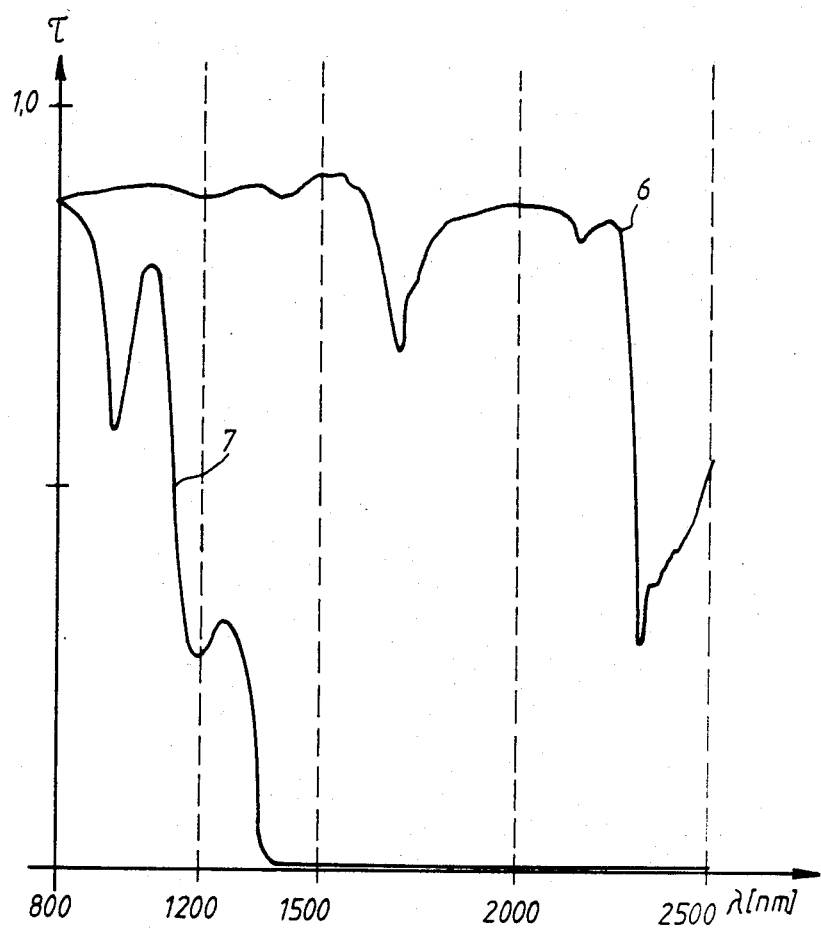
FIG. 3 shows a diagram (wavelength range between 800 and 2500 nm) for one radiation protection filter (foil) with or without water complying with the invention.

The diagram corresponding to FIG. 3 shows for the wave-length range between 800 and 2500 nm in curve 6, the spectral transmittance for a radiation protection filter complying with the invention and composed of a 0.3 mm thick PVC foil and in curve 7, the spectral transmittance for a radiation protection filter composed of two PVC foils of 0.3 mm thickness with a layer of water between of 10 mm. One notices hereby the strong diminution obtained from the transmittance in the wavelength range above 800 nm.

Figure 4:
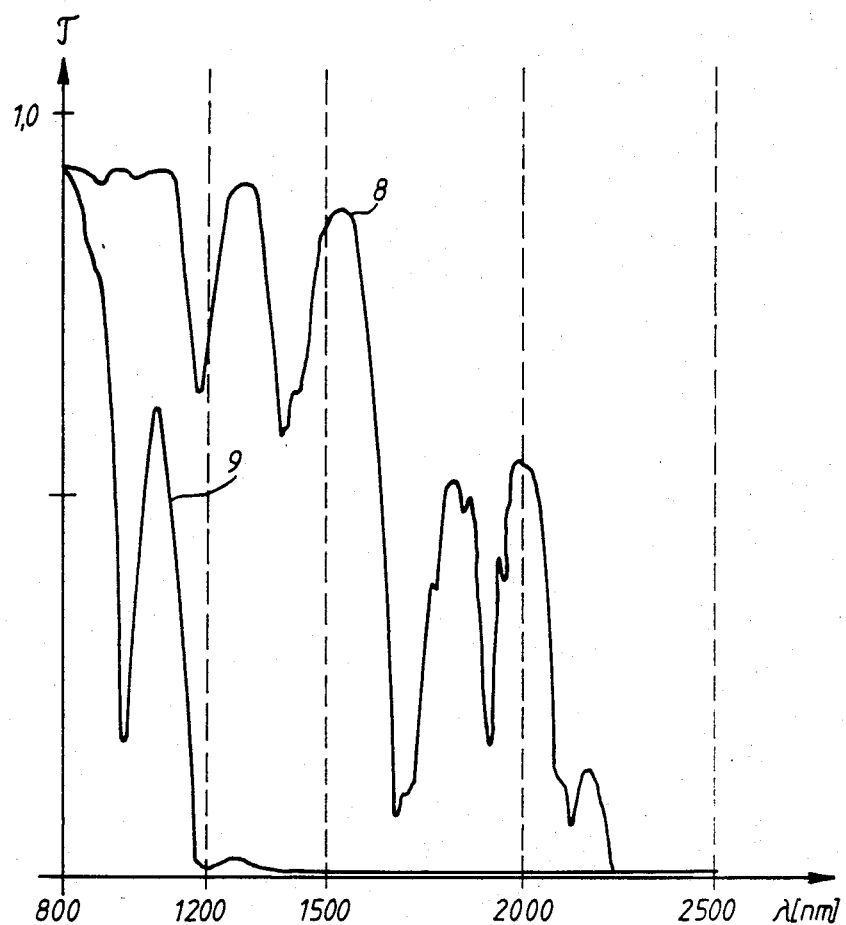
FIG. 4 shows a diagram according to FIG. 3 for one radiation protection filter (sheet) with or without water complying with the invention.

FIG. 4 illustrates—on the other hand, for wavelength range between 800 and 2500 nm—in curve 8, the spectral transmittance for a radiation protection filter complying with the invention, composed of a 4 mm thick PVC sheet and in curve 9, the spectral transmittance for a radiation protection filter complying with the invention out of a PVC double sheet of 2 mm thickness each and a 36 mm thick layer of water.

Figure 5:
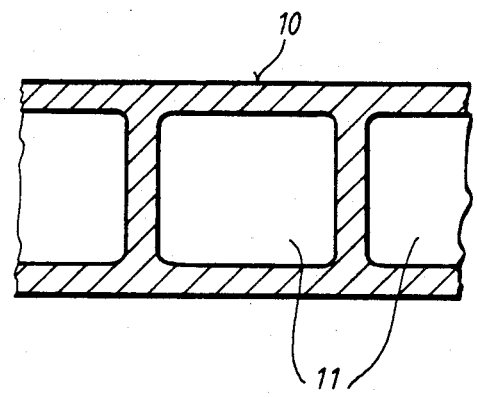
FIGS. 5 and 6 show schemes of two radiation protection filters complying with the invention (with layer of water).

FIG. 5 illustrates in section a radiation protection filter 10 composed of a double sheet showing the chamber 11 filled with water.

Figure 6:
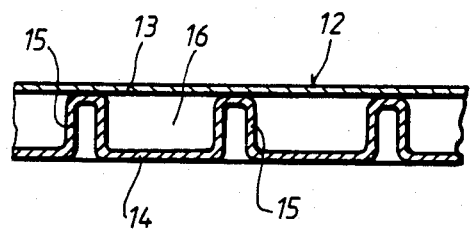

FIG. 6 illustrates a radiation protection filter 12 composed of two sheets 13 and 14 displayed one above the other whereby the sheet 14 is fitted with salient naps 15 through which arises an appropriate cavity 16 for the reception of a layer of water.

To further explain the invention finally the composition of two radiation protection filters complying to the invention are mentioned with which the curve 4 of the spectral transmittance illustrated in FIG. 2 can be obtained:

EXAMPLE 1

| Foil 0,3 mm thick | |
|---|---|
| 2,2-dihydroxy-4-methoxy-benzophenon | 0,25% |
| Perylen red pigment | 1,00% |
| Soft PVC | 98,75% |

EXAMPLE 2

| Sheet 4 mm thick | |
|---|---|
| 2-(2-Hydroxy-5-6-Oktyl-phenyl)-Benzotriazol | 0,02% |
| Quinakridon red pigment | 0.10% |
| Polymethylmethacrylate | 99,88% |

EXAMPLE 3

| (Synthetic Lacquer): | |
|---|---|
| 2-(2-Hydroxy-5-6-Octyl-phenyl)-benzotriazol | 3% |
| Quinakridon-red-pigments | 15% |
| Colourless synthetic lacquer | 82% |

EXAMPLE 4

| (Watersoluble dye): | |
|---|---|
| 2-Hydroxy-4-Methoxy-5-Sulfo-Benzophenone-trihydrate | 4% |
| Azo dye | 4% |
| Cellulose Ether | 1% |
| Polyacrylate | 6% |

| (Watersoluble dye): | |
|---|---|
| Water | 85% |

ADVANTAGE

Dye or lacquer can be provided on glass and plastic sheets or foils (e.g. of greenhouses) to provide a filter in times of high global radiation, said filter being easily removable in times of low radiation.

I claim:

1. Radiation protection filter for plants wherein
    $\tau 1 < 0.02$
    $\tau 3 > 0.4$
    $\tau 3/\tau 4 > 1.5$
    $\tau 4 < 0.4$
    $\tau 5/\tau 4 > 2$
    $\tau 6/\tau 4 > 2$
    and wherein
    $\tau 1$ = average of spectral transmittance between 300 and 330 nm.
    $\tau 3$ = average of spectral transmittance between 400 and 500 nm.
    $\tau 4$ = average of spectral transmittance between 500 and 600 nm.
    $\tau 5$ = average of spectral transmittance between 600 and 700 nm.
    $\tau 6$ = average of spectral transmittance between 700 and 800 nm.

2. Radiation protection filter according to claim 1, consisting of a glass sheet comprising at least one oxide of a metal of the class consisting of cerium, cobalt, copper, manganese and nickel.

3. Radiation protection filter according to claim 1 comprising a transmitting carrier having a coating of a water-soluble dye.

4. Radiation protection filter according to claim 1 comprising a transmitting carrier having a coating of a water-insoluble lacquer.

5. Radiation protection filter according to claim 1, wherein
    $\tau 1 < 0.01$.

6. Radiation protection filter according to claim 1, wherein
    $\tau 2/\tau 4 > 1$ and wherein
    $\tau 2$ = average of spectral transmittance between 330 and 400 nm, and
    $\tau 4$ = average of spectral transmittance between 500 and 600 nm.

7. Radiation protection filter according to claim 1, wherein
    (a) $\tau 3 > 0.5$
    (b) $\tau 3/\tau 4 > 2$
    (c) $\tau 4 < 0.3$
    (d) $\tau 5/\tau 4 > 2.5$
    (e) $\tau 6/\tau 4 > 2.5$.

8. Radiation protection filter according to claim 1, wherein
    $\tau 7 < 0.7$ and wherein
    $\tau 7$ = average of spectral transmittance between 800 and 1200 nm.

9. Radiation protection filter according to claim 1, wherein
    $\tau 8 < 0.05$ and wherein
    $\tau 8$ = average of spectral transmittance between 1200 and 3000 nm.

10. Radiation protection filter according to claim 1, comprising plastic sheets of the class consisting of polyvinyl chloride, polyethylene, polymethacrylate, polyester, polyethylene terephthalat, polycarbonat and fluoropolymer, stains being embedded into said sheets, the declining absorption edge of said stains lying between 450 and 500 nm and their rising absorption edge lying between 575 and 625 nm.

11. Radiation protection filter according to claim 10, comprising at least one of the following stains: monoazo, diazo, anthraquinone, phthalocyanin, perylen, quinakridon and thin ground stained glass powder.

12. Radiation protection filter according to claim 10, comprising organic UV absorbing substances with steep absorption edge lying between 330 and 360 nm embedded in the plastic material.

13. Radiation protection filter according to claim 12, comprising at least one of the following UV absorbing substances: Benzophenone, benzotriazole, combinations with salicylic, cinnamic and oxalic acids.

14. Radiation protection filter according to claim 10, comprising an additional layer of water, glycerol, glycol and mixtures of said liquids for the attenuation of radiation above 800 nm.

* * * * *